UNITED STATES PATENT OFFICE.

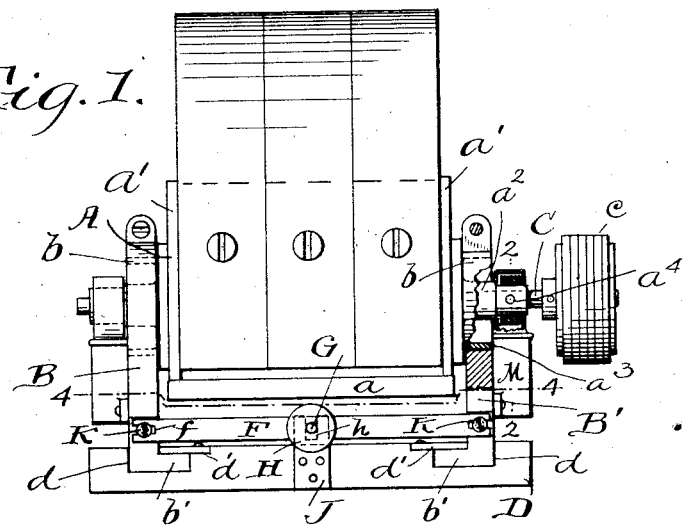

JOSEPH A. WILLIAMS, OF CLEVELAND, OHIO.

MAGNETO-ELECTRIC GENERATOR.

No. 832,354.  Specification of Letters Patent.  Patented Oct. 2, 1906.

Application filed May 14, 1906. Serial No. 316,702.

*To all whom it may concern:*

Be it known that I, JOSEPH A. WILLIAMS, a citizen of the United States, residing at Cleveland, in the county of Cuyahoga and State of Ohio, have invented a certain new and useful Improvement in Magneto-Electric Generators, of which the following is a full, clear, and exact description.

This invention relates particularly to those electric generators of the magneto type which are designed for use on automobiles as a part of the ignition system of the explosion-engines.

The object of this invention is to provide a magneto-electric generator which may be so adjusted as to be capable of being secured in a useful position in any automobile whatever may be the disposition and arrangement of the machinery thereof.

The invention consists in various combinations which include a magneto-electric generator, a device capable of being secured to the automobile-frame and of adjustably supporting the magneto-electric machine in a convenient position and of yieldingly holding it in operative relationship with a rotating part of the automobile mechanism by which the magneto-machine is to be driven, as hereinafter described, and definitely pointed out in the claims.

In the drawings, Figure 1 is a front elevation of a magneto-electric generator embodying the present invention. Fig. 2 is a vertical sectional view on the plane indicated by line 2 2 of Fig. 1. Fig. 3 is an end view thereof. Fig. 4 is a sectional plan view in the plane indicated by line 4 4 of Fig. 1.

The magneto-electric generator may be of any familiar type and of course includes a frame, such as A, to which the magnets are secured and in which the armature-shaft C is rotatably mounted. This frame, as shown, includes a base-plate $a$ and two standards $a'$, which carry the bearings $a^2$ for the armature-shaft C. This frame may be of familiar construction, except that on the outer surface of each of the standards $a'$ is an annular flange $a^3$, which is concentric with the armature-shaft and its bearing $a^2$. These annular flanges $a^3$ are embraced by the split rings $b$, which respectively form the upper parts of the standards B. The feet $b'$ of these standards are fitted into grooves $d$ in a base-plate D, which plate is adapted to be secured to brackets on an automobile-frame. The two grooves $d$ are parallel, and the two standards B are capable of sliding in them, the feet $b'$ being held therein by the overhanging gib-plate $d'$. The plate D and standards B B constitute a supplemental frame, in which the frame A is supported in the manner explained.

A friction driving-wheel $c$ is secured to the end of the armature-shaft C, and this shaft may be driven through the frictional engagement of this wheel with some rotating wheel which forms a part of the automobile machinery—for example, the fly-wheel of the engine—or by a belt engaging with such rotating member. The movement of the standards B in the grooves $b$ carries this wheel $c$ toward or from that rotating member of the automobile machinery by which the wheel $c$ is to be driven.

A spring-bar F may be secured in any appropriate manner to the two standards B. Preferably this spring is slotted, as at $ff$, and screws K passing through these slots screw into the standards B to secure the spring-bar thereto. The force tending to move both of the standards B in grooves $d$ either forward or backward is to be applied through this spring F. The means shown for so doing consists of a screw G, which passes through a hole in the spring F and has a nut $g$ on one side of said spring, substantially clamping the spring between it and the head of the screw. A nut H, having an annular groove $h$, is screwed onto this screw. A forked plate J, secured to the base-plate D, embraces this nut H in the groove $h$. It is therefore apparent that by turning this nut, which cannot move endwise, the screw is caused to either push or pull spring F, and thereby to move both standards B in the required direction and the required distance. There is another similar fork-plate J' secured to the opposite side of the base-plate D, and the spring-bar F may be secured to the opposite sides of the standards B B, the screw-holes for this purpose being indicated by dotted lines at $f^2$ in Fig. 3. If, for example, the magneto-electric machine were swung over to the right to the position indicated by dotted lines, it would be difficult to get at the adjusting-nut H. It is therefore an advantage to transfer the spring to the opposite sides of standards B B, because then the nut is more easily accessible, and since the standards may be moved in either direction by the mechanism shown they may be moved to the required position.

With the above-described construction it is evident that if the disposition of the automobile machinery is such that the magneto-electric generator cannot occupy the position relative to plate D (shown by full lines in Fig. 3) said generator may be turned about the axis of the armature-shaft into any other position, as indicated by dotted lines in Fig. 3 and when it is in a position where it is not interfered with by the other mechanism it may be secured by clamping the flanges $a^3$ in the split rings $b$.

In machines of this sort the armature-shaft is revolved rapidly and must therefore be lubricated. For this purpose oil-cups M are provided and are secured to the standards B. A casing $m$ is secured to the upper end of this oil-cup and embraces the bearing $a^2$ for the armature-shaft. Within this casing a felt washer N is placed, embracing said bearing, and in the bearing are a plurality of holes $a^4$, in which there may be bits of felt or wicking, which touch the armature-shaft C and this felt ring N. A wick P, of felt or some other analogous material, may dip into the oil and be held by a light spring $p$ in contact with the felt ring N. This oil-cup maintains its upright position, and the described adjunctive parts preserve their relationship with the oil-cup and with the bearing, however much said bearing may be turned relative to the standards B.

Having described my invention, I claim—

1. The combination of a magneto-electric generator, with a supplemental frame in which the frame of the generator is mounted on an axis coincident with the axis of the armature-shaft, and means preventing the turning of said generator in said supplemental frame.

2. The combination of a magneto-electric generator whose frame is provided with annular flanges concentric with the bearings of the armature-shaft, with a supporting-frame in which said annular flanges are mounted, and means for preventing the turning thereof.

3. The combination of a magneto-electric generator whose frame is provided with annular flanges concentric with the bearings of the armature-shaft, with a supporting-frame having two standards which are respectively formed with split rings at one end which embrace the annular flanges above mentioned, and means for clamping said split rings upon said flanges.

4. The combination of a grooved base-plate, and two standards slidably mounted in said grooves, with a magneto-electric generator rotatably mounted in said standards on an axis coincident with the axis of the armature-shaft, means for preventing the turning of said generator in said standards, and means for moving said standards in said grooves.

5. The combination of a base-plate, standards slidably supported thereon, and mechanism including a spring for moving said standards, with a magneto-electric generator whose frame is provided with annular flanges which are concentric with the armature-shaft, which flanges are mounted in said standards, and means preventing them from turning therein.

6. The combination of a grooved base-plate, and two standards slidably mounted in said grooves, with a magneto-electric machine secured to said standards, and means for yieldingly applying force to said standards to move them in said grooves either forward or backward.

7. The combination of a grooved base-plate, two standards slidably mounted in said grooves and having split rings at their upper ends, a spring-bar connected with said standards, and means for applying force to said spring-bar to move said standards in said grooves, with a magneto-electric generator whose frame is provided with two annular flanges which are concentric with the axis of the armature-shaft and which are mounted in said split rings, and means for clamping said split rings upon said flanges.

8. The combination of a base-plate, and standards movably mounted thereon, with a magneto-electric generator whose frame is supported by and capable of turning in said standards on an axis concentric with the armature-shaft, means for preventing said frame from turning in said standards, a spring secured to said standards, and means wherewith to either push or pull said spring and thereby to move said standards in either direction.

9. The combination of a base-plate, and standards movably mounted thereon, with a magneto-electric generator whose frame is supported by and capable of turning in said standards on an axis concentric with the armature-shaft, means for preventing said frame from turning in said standards, a spring, means for securing said spring to said standards on either side thereof, and means engaging with said spring in which position it may be secured to move it and the standards in either direction.

10. The combination of a base-plate, and standards movably mounted thereon, with a magneto-electric generator whose frame is supported by and capable of turning in said standards on an axis concentric with the armature-shaft, means for preventing said frame from turning in said standards, a flat spring secured to the two standards, a screw attached to said flat spring, a nut upon said screw, and means preventing endwise movement of the nut while permitting it to rotate.

In testimony whereof I hereunto affix my signature in the presence of two witnesses.

JOSEPH A. WILLIAMS.

Witnesses:
E. B. GILCHRIST,
E. L. THURSTON.